United States Patent
Oyamada et al.

(10) Patent No.: US 8,135,255 B2
(45) Date of Patent: Mar. 13, 2012

(54) OPTICAL FIBER

(75) Inventors: Hiroshi Oyamada, Gunma (JP); Yuhei Urata, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 103 days.

(21) Appl. No.: 12/782,487

(22) Filed: May 18, 2010

(65) Prior Publication Data

US 2011/0286711 A1    Nov. 24, 2011

(30) Foreign Application Priority Data

May 20, 2009    (JP) ................. 2009-121938

(51) Int. Cl.
*G02B 6/036* (2006.01)
(52) U.S. Cl. ........................ 385/126; 385/123
(58) Field of Classification Search .......... 385/123, 385/124, 126, 127, 128, 141
See application file for complete search history.

(56) References Cited

U.S. PATENT DOCUMENTS

| 2001/0017967 | A1 | 8/2001 | Hirano et al. |
| 2003/0026566 | A1 | 2/2003 | Diep et al. |
| 2004/0033039 | A1 | 2/2004 | Oliveti et al. |
| 2010/0296783 | A1* | 11/2010 | Oyamada ............ 385/126 |

FOREIGN PATENT DOCUMENTS

| EP | 1 107 027 A1 | 6/2001 |
| EP | 2253975 A1 * | 11/2010 |
| JP | 2002-47027 A | 2/2002 |
| JP | 2004-508600 A | 3/2004 |
| JP | 2006-133496 A | 5/2006 |

OTHER PUBLICATIONS

European search report dated Oct. 14, 2010, in a counterpart European patent application No. 10163347.7 for Examiner consideration.
Kawakami et al., "Characteristics of a Doubly Clad Optical Fiber with a Low-Index Inner Cladding", IEEE Journal of Quantum Electronics, Dec. 1974, vol. QE-10, No. 12, pp. 879-887.
Applicant bring the attention of the Examiner to the following pending U.S. Appl. No. 12/782,459, filed May 18, 2010.

* cited by examiner

*Primary Examiner* — Brian Healy
(74) *Attorney, Agent, or Firm* — Chen Yoshimura LLP

(57) ABSTRACT

Provided is an optical fiber including: a core at a center thereof; a first cladding adjacent to the core to cover a circumference of the core; and a second cladding adjacent to the first cladding to cover a circumference of the first cladding, where $0.35\% \leq (\Delta_1 - \Delta_2) \leq 0.65\%$, $0.30\% \leq \Delta_1 \leq 0.55\%$, $-0.20\% \leq \Delta_2 \leq -0.05\%$, $0.22 \leq a/b \leq 0.34$, and $4 \leq b\sqrt{|\Delta_2|} \leq 10$ hold, and loss increase resulting when the optical fiber is wound on a mandrel having a diameter of 20 mm is 0.5 dB/turn or smaller at a wavelength of 1550 nm, where $\Delta_1(\%)$ is a specific refractive index difference of a maximum of a refractive index distribution of the core with reference to a refractive index of the second cladding, $\Delta_2(\%)$ is a specific refractive index difference of a minimum of a refractive index distribution of the first cladding with reference to the refractive index of the second cladding, $a(\mu m)$ is a radius of a boundary between the core and the first cladding with respect to a center of the core, and $b(\mu m)$ is a radius of a boundary between the first cladding and the second cladding with respect to the center of the core.

12 Claims, 2 Drawing Sheets

[TABLE 1]

| | $\Delta_1$(%) | $\Delta_2$(%) | A/B (−) | $b\sqrt{|\Delta_2|}$ ($\mu m\%^{1/2}$) | α | FIBER CUTOFF (nm) | MFD ($\mu m$) | BENDING LOSS D:20 1550nm (dB/turn) | ZERO-DISPERSION WAVELENGTH (nm) | 850nm BAND (MHz·km) |
|---|---|---|---|---|---|---|---|---|---|---|
| EMBODIMENT EXAMPLE 1 | 0.37 | −0.11 | 0.304 | 7.14 | 2.5 | 1245 | 9.23 | 0.073 | 1313 | 1674 |
| 2 | 0.41 | −0.18 | 0.335 | 8.54 | 3.3 | 1293 | 9.45 | 0.092 | 1318 | 1126 |
| 3 | 0.40 | −0.07 | 0.294 | 5.67 | 2.1 | 1264 | 9.02 | 0.043 | 1320 | 1369 |
| 4 | 0.31 | −0.09 | 0.241 | 8.04 | 4.8 | 1322 | 8.90 | 0.022 | 1317 | 783 |
| COMPARISON EXAMPLE 1 | 0.42 | −0.15 | 0.308 | 11.0 | 1.3 | 1398 | 7.14 | 0.267 | 1332 | 326 |
| 2 | 0.37 | −0.15 | 0.226 | 12.05 | 1.1 | 1535 | 9.68 | 0.0044 | 1309 | 254 |
| 3 | 0.46 | −0.11 | 0.372 | 7.12 | 1.3 | 1346 | 8.95 | 0.0073 | 1324 | 436 |
| 4 | 0.45 | −0.11 | 0.295 | 7.40 | 1.2 | 1213 | 8.54 | 0.052 | 1334 | 367 |
| 5 | 0.44 | −0.11 | 0.40 | 6.52 | 1.5 | 1276 | 9.02 | 0.033 | 1341 | 231 |
| 6 | 0.31 | −0.16 | 0.168 | 10.89 | 6 | 1176 | 10.21 | 0.674 | 1296 | 343 |

FIG.2

OPTICAL FIBER

The contents of the following patent application is incorporated herein by reference, No. 2009-121938 filed on May 20, 2009.

BACKGROUND

1. Technical Field

The present invention relates to an optical fiber for optical communication, and particularly relates to an optical fiber suitable as a long distance line and Optical Fiber To The Home (FTTH) having transmission length of some tens of kilometers, and interconnection inside or outside homes in local area networks (LAN).

2. Related Art

Optical fibers are suitable for long distance communication for their wide band characteristics, and are widely used for communication in main lines of a long distance such as some tens of kilometers and above.

On the other hand, with rapid prevalence of the Internet, the amount of information transceived by individual personal computers has also increased dramatically. The widely used technology in this field has been copper electric cables such as a coaxial cable and an unshielded twisted pair (UTP) cable. Such electric cables, however, have a narrow band and so are easily affected by the electromagnetic wave noise, and so cannot easily transmit a large amount of information.

As a solution, as a technology capable of increasing the transmission capacity, FTTH has started to prevail, which uses an optical fiber also in communication between each user and a telephone station, not only to long distance communication between telephone stations. Utilizing wide band characteristics of optical fibers, The FTTH technology adopts such a system in which a single line of optical fiber is shared among a plurality of users of a group up to the vicinity of the group, and an optical signal is branched for each user and an extension of optical fiber is distributed to each user.

There are various types of optical fibers, among which a single mode optical fiber of ITU-T G. 650 standard is mainly used for long distance communication. This type of optical fiber has a small transmission loss, and comparatively cheap. The cutoff wavelength of it is about 1300 nm or below such that the signals of 1300 nm band are in the single mode. Moreover, the mode field diameter (MFD) of it is normally in the range of about 9-10 μm so as to restrain the optical nonlinearity, as opposed to the MFD rating of about 8-10 μm.

The FTTH also uses a similar type of single mode optical fiber, in which an extension is drawn into the home of each user from a branch point. This is because if optical fibers widely different in MFD are connected to each other, it would cause transmission loss. Another important requirement of intra-home interconnection is bending loss. Long distance main line cables are laid in underground ducts unsusceptible to external force, and so the bending force exerted on the optical fiber main body can be assumed to correspond to only winding of a diameter of 60 mm within a terminal container (100 times at most). As opposed to this, inside and outside homes, the interconnection is pursued in the state of relatively thin codes (diameter of some millimeters) so as to be flexible and light, which is susceptible to outer force and the bending radius on the optical fiber often becomes 20 mm or smaller.

An optical fiber inherently has a characteristic of propagating signal light along a core of the optical fiber, and so being capable of transmission even in the bent state. However as the bending radius becomes small, the ratio of leak of unpropagated light from the core increases in an exponential fashion, to cause transmission loss. This is referred to as bending loss. So as to reduce the bending loss, it is effective to focus light to the core as much as possible, which is realized by reducing the MFD. With this in view, normally an optical fiber having MFD of about 6-8 μm is used, to realize bending loss of about 0.5 dB/turn at the wavelength of 1550 nm, when wound around a mandrel (cylinder) having a diameter of 20 mm for example.

However, connection loss is large when an optical fiber having MFD of about 6 μm is connected to an optical fiber having MFD of about 10 μm, and so the main line and the user line should operate in single mode optical fiber systems separate from each other. One way to solve this problem is to enlarge the cutoff wavelength. With the same MFD, the bending loss decreases in an exponential fashion as the cutoff wavelength increases. Even if the fiber cutoff wavelength defined by ITU-T G.650 is 1350 nm, the cable cutoff wavelength is generally about 1250 nm, which is about 100 nm shorter than the fiber cutoff wavelength, and so it does not pose problems in practical usage in the 1300 nm band. If the MFD is designed to be in the range of about 8-9 μm, which is close to the lower limit of G652, the bending loss will be alleviated.

The bending loss can also be reduced by using a double clad optical fiber having a small inner cladding refractive index while enlarging the MFD, as reported such as in Shojiro Kawakami and Shigeo Nishida, "Characteristics of a Doubly Clad Optical Fiber with a Low-Index Inner Cladding," IEEE Journal of Quantum Electronics, vol. QB-10, No. 12, pp. 879-88'7, Dec. 1974. An optical fiber having a reduced impurity absorption loss and an optimized zero-dispersion wavelength by adopting the mentioned structure is disclosed in Japanese Patent Application Publication No. 2002-47027. With this technology, a specific refractive index difference of a low reflactive cladding is set to be about −0.021 to −0.0007%, and an MFD is set to be about 9.2 μm. Japanese Patent Application Publication No. 2006-133496 also discloses an optical fiber having an improved bending characteristic. Using this technology, the low refractive index cladding is further reduced to be in the range of −0.08 to −0.02%, and the MFD is designed to be a slightly smaller, such as in the range of 8.2 to 9.0 μm.

On the other hand, a technology of providing interconnection using an optical fiber between electronic appliances has started to prevail. A representative LAN communication standard IEEE 802.3 lists various types of optical fibers. Laser optical sources and optical receivers used in the wavelength of 1300 nm band are comparatively expensive, and so cheaper light emitting diodes (LED) and a surface emitting lasers (VCSEL) in the 850 nm band are often used. The optical fibers used for this purpose is a multimode optical fiber, which typically has a core diameter of 50 μm. The multimode optical fiber generally has different light propagation speed for each mode, and so has a parabolic shaped refractive index distribution ($\alpha$ type), instead of a simple step-like refractive index distribution, to reduce the difference in light propagation speed between modes. Such a device realizes a propagation speed of 500 MHz/km for example.

For the purpose of using an optical fiber having a common specification in such usages as the long distance transmission path, the FTTH, and LAN, Japanese Patent Application Publication (translation of PCT application) No. 2004-508600 discloses designing the core's refractive index distribution in substantially $\alpha$ shape, to reduce the mode delay in the 850 nm band to guarantee its usage in the 850 nm band. However, it fails to mention bending loss in a smaller diameter (e.g. about 20 mm).

SUMMARY

Therefore, it is an object of an aspect of the innovations herein to provide an optical fiber, which is capable of overcoming the above drawbacks accompanying the related art. The above and other objects can be achieved by combinations described in the independent claims. The dependent claims define further advantageous and exemplary combinations of the innovations herein.

In view of the above-described prior art, the present invention aims to provide an optical fiber having MFD conforming to G652 standard (preferably 9 μm or above), improved bending characteristics, as well as providing an optical fiber having a sufficiently wide transmission band in multimode transmission in the 850 nm band, in view of application to a light source in the 850 nm band.

So as to solve the above-stated problem, according to a first aspect related to the innovations herein, provided is an optical fiber including: a core at a center thereof; a first cladding adjacent to the core to cover a circumference of the core; and a second cladding adjacent to the first cladding to cover a circumference of the first cladding, where $0.35\% \leq (\Delta_1-\Delta_2) \leq 0.65\%$, $0.30\% \leq \Delta_1 \leq 0.55\%$, $-0.20\% \leq \Delta_2 \leq -0.05\%$, $0.22 \leq a/b \leq 0.34$, and $4 \leq b\sqrt{|\Delta_2|} \leq 10$ hold, and loss increase resulting when the optical fiber is wound on a mandrel having a diameter of 20 mm is 0.5 dB/turn or smaller at a wavelength of 1550 nm, where $\Delta_1(\%)$ is a specific refractive index difference of a maximum of a refractive index distribution of the core with reference to a refractive index of the second cladding, $\Delta_2(\%)$ is a specific refractive index difference of a minimum of a refractive index distribution of the first cladding with reference to the refractive index of the second cladding, a(μm) is a radius of a boundary between the core and the first cladding with respect to a center of the core, and b(μm) is a radius of a boundary between the first cladding and the second cladding with respect to the center of the core.

According to a second aspect related to the innovations herein, the optical fiber is fitted in an expression of $\Delta(r)=(\Delta_{1*}-\Delta_a)(1-r/a)^\alpha+\Delta_a$, where $\Delta(r)(\%)$ represents a specific refractive index difference for a refractive index at a radius r(μm) from the center with reference to a refractive index of the second cladding, and where $\Delta_{1*}$ represents a fitting coefficient, $\Delta_a$ represents a specific refractive index difference (%) of a refractive index of r=a with respect to the refractive index of the second cladding, and α is a multiplier. The α is in a range of 2 and 5, inclusive.

In addition, the fiber cutoff wavelength measured for the optical fiber having a length of 2 m defined in ITU-T G. 650 standard is 1350 nm or below, and the cable cutoff wavelength measured for the optical fiber having a length of 22 m defined in ITU-T G. 650 standard is 1260 nm or below. The optical transmission mode at a wavelength of 850 nm is substantially multimode, and loss increase resulting when the optical fiber is wound on a mandrel having a diameter of 20 mm is 0.5 dB/turn or below at a wavelength of 850 nm. The transmission band at the wavelength of 850 nm is 500 MHz/km or above, and the zero-dispersion wavelength is in a range of 1300 nm to 1324 nm, inclusive. The mode field diameter at a wavelength of 1310 nm is in a range of 8.0 μm to 10.0 μm, inclusive, and the transmission loss at a wavelength of 1383 nm is 0.4 dB/km or below.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 2 is a table showing the results of the characteristics measurement of the optical fibers as embodiment examples and comparison examples.

DESCRIPTION OF EXEMPLARY EMBODIMENTS

Figure 1:
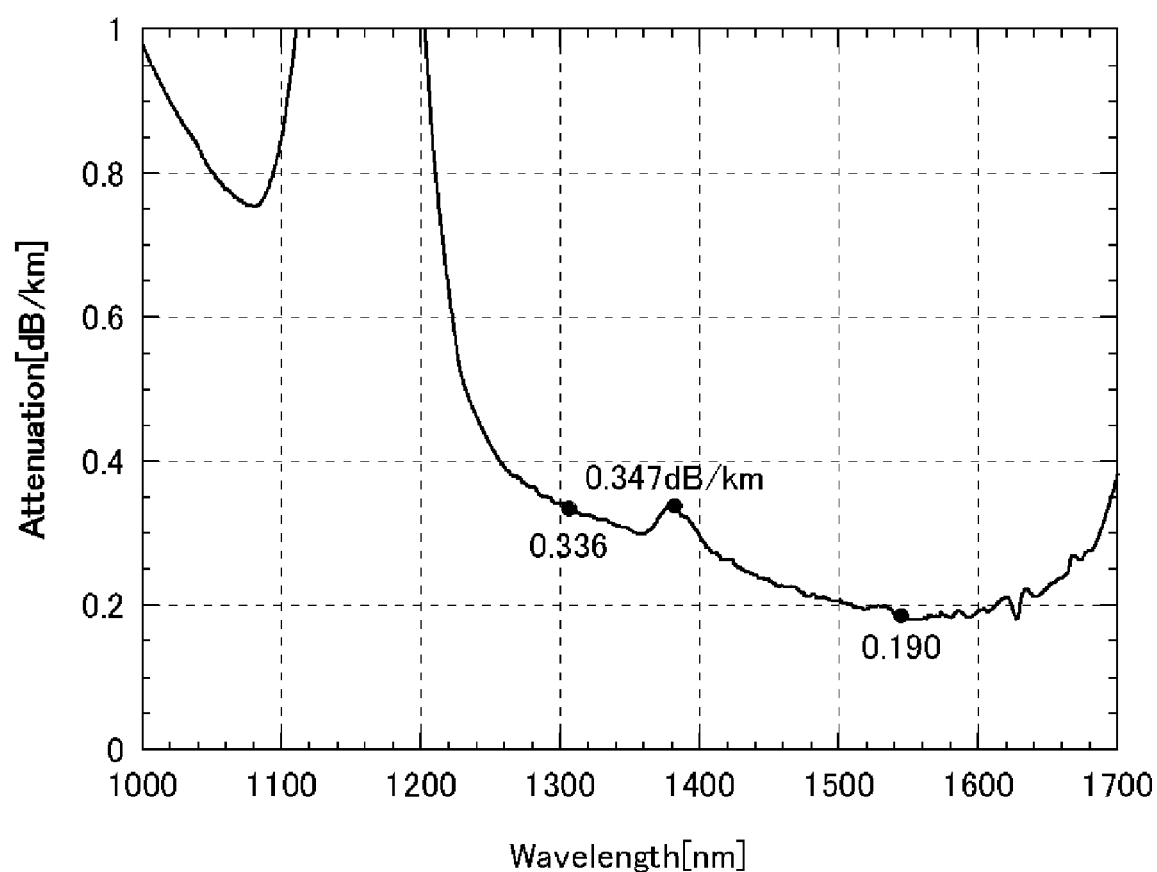
FIG. 1 is a graph showing a relation between a wavelength and a transmission loss.

Some aspects of the invention will now be described based on the embodiments, which do not intend to limit the scope of the present invention, but exemplify the invention. All of the features and the combinations thereof described in the embodiment are not necessarily essential to the invention.

The optical fiber according to the present invention includes a first cladding to cover a core at a center of the optical fiber and a second cladding adjacent to the first cladding, and a specific refractive index difference $\Delta_1(\%)$ of the maximum of the refractive index distribution of the core is expressed as $0.30\% \leq \Delta_1 \leq 0.55\%$, a specific refractive index difference $\Delta_2(\%)$ from the minimum of the refractive index distribution of the first cladding is expressed as $-0.20\% \leq \Delta_2 \leq -0.05\%$, the difference between $\Delta_1(\%)$ and $\Delta_2(\%)$ is expressed as $0.35\% \leq (\Delta_1-\Delta_2) \leq 0.65$, and the ratio between the radius "a" (μm) of the boundary between the core and the first cladding from the core center and the radius "b" (μm) of the boundary between the first cladding and the second cladding from the core center is expressed by the expressions $0.22 \leq a/b \leq 0.34$ and $4 \leq b\sqrt{|\Delta_2|} \leq 10$, thereby setting the MFD in the range of 8 to 10 μm, the cutoff wavelength to be 1350 nm or below, and the bending loss when wound to a mandrel having a diameter of 20 mm is reduced to be 0.5 dB/turn or below. Note that the specific refractive index differences $\Delta_1$ and $\Delta_2$ are set with reference to the refractive index of the second cladding.

In the optical fiber according to the present invention, the refractive index distribution for the core is shaped as α multiplier, and the specific refractive index difference $\Delta(r)(\%)$ from the core center to the refractive index at the radius r(μm) is fitted using the following expression: $\Delta(r)=(\Delta_{1*}-\Delta_a)(1-r/a)^\alpha+\Delta_a$.

Here, $\Delta_{1*}$ represents a fitting coefficient and $\Delta_a$ represents a specific refractive index difference (%) of the r=a to the refractive index, and both of the specific refractive index differences are obtained with reference to the refractive index of the second cladding. Also α is set to be in a range of 2 and 5, inclusive. Accordingly, the zero-dispersion wavelength lies within a range of 1300 to 1324 nm, and the transmission band at 850 nm is 500 MHz/km or more.

In the optical fiber according to the present invention, the fiber cutoff wavelength measured for an optical fiber having a length of 2 m defined in ITU-T G.650 standard is 1350 nm or below, and the cable cutoff wavelength measured for an optical fiber having a length of 22 m is 1260 nm or below. Furthermore, the optical transmission mode at the wavelength of 850 nm is substantially a multimode, the loss increase at this wavelength is 0.5 dB/turn or below when winding the optical fiber to a mandrel having a diameter of 20 mm, the transmission band at the wavelength of 850 nm is 500 MHz/km or more, the zero-dispersion wavelength is in a range of 1300 nm to 1324 nm, inclusive, the mode field diameter at the wavelength of 1310 nm is in a range of 8.0 μm to 10.0 μm, inclusive, and the transmission loss at the wavelength of 1383 nm is 0.4 B/km or below.

As a result of obtaining these characteristics, the created optical fiber according to the present invention can be applied from long distance transmission to short distance applications, endure severe bending force outside homes, as well as being capable of being used in the 850 nm band.

EMBODIMENT EXAMPLES

In Embodiment Example 1, the numerical value for each parameter for a desirable optical fiber is set first, and material supply conditions and deposition conditions are appropriately set in accordance with the numerical values. Then, a VAD method is used to manufacture a core material having a core region and a first cladding adjacent to the core and covering a circumference of the core. After stretching the core material into a desirable diameter, a second cladding is formed at an exterior of it. Thus obtained glass base material is drawn to have a cladding diameter of 125 μm. Then, the circumference of the cladding is coated with urethane acrylate, thereby obtaining an optical fiber wire having a length of 250 mm. Each parameter of the optical fiber manufactured in the above manner is as follows.
(1) the specific refractive index difference $\Delta_1$ of the maximum of the refractive index distribution of the core: 0.37(%)
(2) the specific refractive index difference $\Delta_2$ from the minimum of the refractive index distribution of the first cladding: −0.11(%)
(3) the ratio "a/b" between the radius "a" of the core diameter and the radius "b" of the first cladding diameter: 0.304
(4) b $\sqrt{|\Delta_2|}$: 7.14
(5) α value: 2.5

The characteristics of the obtained optical fibers were measured, and the result is shown in Table 1 as embodiment examples, together with comparison examples. Note that in the table, the cutoff wavelength is measured for the optical fiber having a length of 2 m defined in ITU-T G. 650 standard, and the bending loss is measured by winding the optical fibers to a mandrel having a diameter of 20 mm.

FIG. 1 shows a wavelength spectroscopic characteristic for the optical fiber obtained as Embodiment Example 1, which shows an OH peak at 1385 nm of 0.347 dB/km.

Embodiment Examples 2-4 result by varying each parameter in the range defined in claim 1, and Comparison Examples 1-6 are manufactured by setting at least one parameter to be out of the defined range.

In Table 1, all Embodiment Examples 1-4 have MFD of substantially 9 μm or more, and cutoff frequency of 1350 nm or below. Furthermore, the bending loss at the winding diameter of 20 mm is extremely small such as 0.1 dB/turn or below. The zero-disperision wavelength lies within a range of 1300 to 1324 nm. Furthermore, the transmission band at 850 nm is sufficiently wide such as 500 MHz/km or more.

As opposed to this, Comparison Examples 1-6, having at least one parameter out of the defined range, have a narrow band especially at 850 nm.

As clear from the above explanation, according to the above-stated configuration, the embodiment examples of the present invention can provide advantageous effects such as setting MFD within a range of 8.0 μm to 10.0 μm, improving bending loss, and providing characteristics such as small transmission loss and sufficiently wide multimode transmission band at the wavelength of 850 nm, and the created optical fiber can be applied from long distance transmission to short distance applications, endure severe bending force outside homes, as well as being capable of being used in the 850 nm band. Communication characteristics improve by using an optical fiber according to the present invention.

Although some aspects of the present invention have been described by way of exemplary embodiments, it should be understood that those skilled in the art might make many changes and substitutions without departing from the spirit and the scope of the present invention which is defined only by the appended claims.

What is claimed is:
1. An optical fiber comprising:
   a core at a center thereof;
   a first cladding adjacent to the core to cover a circumference of the core; and
   a second cladding adjacent to the first cladding to cover a circumference of the first cladding, wherein
   $0.35\% \leq (\Delta_1-\Delta_2) \leq 0.65\%$, $0.30\% \leq \Delta_1 \leq 0.55\%$, $-0.20\% \leq \Delta_2 \leq -0.05\%$, $0.22 \leq a/b \leq 0.34$, and $4 \leq b\sqrt{|\Delta_2|} \leq 10$ hold, and loss increase resulting when the optical fiber is wound on a mandrel having a diameter of 20 mm is 0.5 dB/turn or smaller at a wavelength of 1550 nm, where $\Delta_1(\%)$ is a specific refractive index difference of a maximum of a refractive index distribution of the core with reference to a refractive index of the second cladding, $\Delta_2(\%)$ is a specific refractive index difference of a minimum of a refractive index distribution of the first cladding with reference to the refractive index of the second cladding, a(μm) is a radius of a boundary between the core and the first cladding with respect to a center of the core, and b(μm) is a radius of a boundary between the first cladding and the second cladding with respect to the center of the core.

2. The optical fiber according to claim 1, wherein the refractive index distribution of the core is shaped as α multiplier.

3. The optical fiber according to claim 1 fitted in an expression of $\Delta(r)=(\Delta_{1*}-\Delta_a)(1-r/a)^\alpha + A_a$, where $\Delta(r)(\%)$ represents a specific refractive index difference for a refractive index at a radius r(μm) from the center with reference to a refractive index of the second cladding, and where $\Delta_{1*}$ represents a fitting coefficient, $\Delta_a$ represents a specific refractive index difference (%) of a refractive index of r=a with respect to the refractive index of the second cladding, and α is a multiplier.

4. The optical fiber according to claim 2, wherein the α is in a range of 2 and 5, inclusive.

5. The optical fiber according to claim 1, wherein a fiber cutoff wavelength measured for the optical fiber having a length of 2 m defined in ITU-T G. 650 standard is 1350 nm or below.

6. The optical fiber according to claim 1, wherein a cable cutoff wavelength measured for the optical fiber having a length of 22 m defined in ITU-T G. 650 standard is 1260 nm or below.

7. The optical fiber according to claim 1, wherein an optical transmission mode at a wavelength of 850 nm is substantially multimode.

8. The optical fiber according to claim 7, wherein loss increase resulting when the optical fiber is wound on a mandrel having a diameter of 20 mm is 0.5 dB/turn or below at a wavelength of 850 nm.

9. The optical fiber according to claim 7, wherein a transmission band at the wavelength of 850 nm is 500 MHz/km or above.

10. The optical fiber according to claim 1, wherein a zero-dispersion wavelength is in a range of 1300 nm to 1324 nm, inclusive.

11. The optical fiber according to claim 1, wherein a mode field diameter at a wavelength of 1310 nm is in a range of 8.0 μm to 10.0 μm, inclusive.

12. The optical fiber according to claim 1, wherein a transmission loss at a wavelength of 1383 nm is 0.4 dB/km or below.

* * * * *